(12) United States Patent
Costigan

(10) Patent No.: US 10,406,893 B2
(45) Date of Patent: Sep. 10, 2019

(54) INNER SUPPORT PANEL FOR MOUNTING A HARDWARE MODULE OF A VEHICLE DOOR ASSEMBLY

(71) Applicant: GM GLOBAL TECHNOLOGY OPERATIONS LLC, Detroit, MI (US)

(72) Inventor: Terrence P. Costigan, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 447 days.

(21) Appl. No.: 15/196,622

(22) Filed: Jun. 29, 2016

(65) Prior Publication Data
US 2018/0001749 A1  Jan. 4, 2018

(51) Int. Cl.
*B60J 5/04* (2006.01)
*E06B 3/36* (2006.01)

(52) U.S. Cl.
CPC ........... *B60J 5/0413* (2013.01); *B60J 5/0411* (2013.01); *B60J 5/0415* (2013.01); *B60J 5/0416* (2013.01); *E06B 3/36* (2013.01)

(58) Field of Classification Search
CPC ....... B60J 5/0413; B60J 5/0411; B60J 5/0415
USPC .......................................................... 49/502
See application file for complete search history.

(56) References Cited

U.S. PATENT DOCUMENTS

| | | | |
|---|---|---|---|
| 3,782,036 A * | 1/1974 | Clark | B60J 5/0412 49/502 |
| 4,651,470 A * | 3/1987 | Imura | B60J 5/0411 296/146.6 |
| 6,880,870 B2 | 4/2005 | Costigan | |
| 7,225,702 B2 | 6/2007 | Fannon et al. | |
| 7,665,776 B2 | 2/2010 | Lang | |
| 7,726,726 B2 | 6/2010 | Cavallin et al. | |
| 7,731,268 B2 | 6/2010 | Motowski et al. | |
| 7,766,401 B2 | 8/2010 | Costigan | |
| 7,810,865 B2 | 10/2010 | Costigan | |
| 8,128,137 B2 | 3/2012 | Takaya et al. | |
| 8,376,424 B2 | 2/2013 | Bejune | |
| 8,469,411 B2 | 6/2013 | Costigan | |
| 9,062,477 B2 | 6/2015 | Da Deppo et al. | |
| 9,254,733 B2 | 2/2016 | Costigan et al. | |
| 2002/0007598 A1 * | 1/2002 | Nishikawa | B60J 5/0416 49/502 |
| 2004/0098922 A1 * | 5/2004 | Nakagawa | B60J 5/0416 49/502 |
| 2005/0040657 A1 | 2/2005 | Costigan | |
| 2007/0039245 A1 * | 2/2007 | Buchta | B60J 5/0416 49/502 |

(Continued)

*Primary Examiner* — Gregory J Strimbu
(74) *Attorney, Agent, or Firm* — Quinn IP Law

(57) ABSTRACT

A door inner support panel for a vehicle door assembly includes a header section with a window frame for receiving a windowpane. A shell section is attached to the header section and mounts to a door frame of a body of a vehicle. The shell section has a hardware frame for mounting a hardware module. The hardware frame includes: a mounting interface on the an inboard surface of the shell section for coupling to an outboard surface of the hardware module; a mounting interface on a flanged surface of the shell section for sealingly attaching to a peripheral surface of the hardware module; and a mounting interface on the outboard surface of the shell section for coupling to an inboard surface of the hardware frame. A method of making the door inner support panel is also disclosed.

20 Claims, 2 Drawing Sheets

(56) References Cited

U.S. PATENT DOCUMENTS

| | | | |
|---|---|---|---|
| 2007/0062123 A1* | 3/2007 | Kruger | B60J 5/0416 49/502 |
| 2007/0125003 A1* | 6/2007 | Wartzack | B60J 5/0405 49/502 |
| 2008/0229671 A1* | 9/2008 | Takeda | B60J 5/0416 49/502 |
| 2008/0289259 A1 | 11/2008 | Costigan et al. | |
| 2013/0181475 A1* | 7/2013 | Torii | B60J 5/0413 296/146.7 |
| 2014/0361576 A1* | 12/2014 | Storgato | B60J 5/0416 296/146.6 |
| 2017/0225547 A1* | 8/2017 | Colosseo | B60J 5/0413 |

* cited by examiner

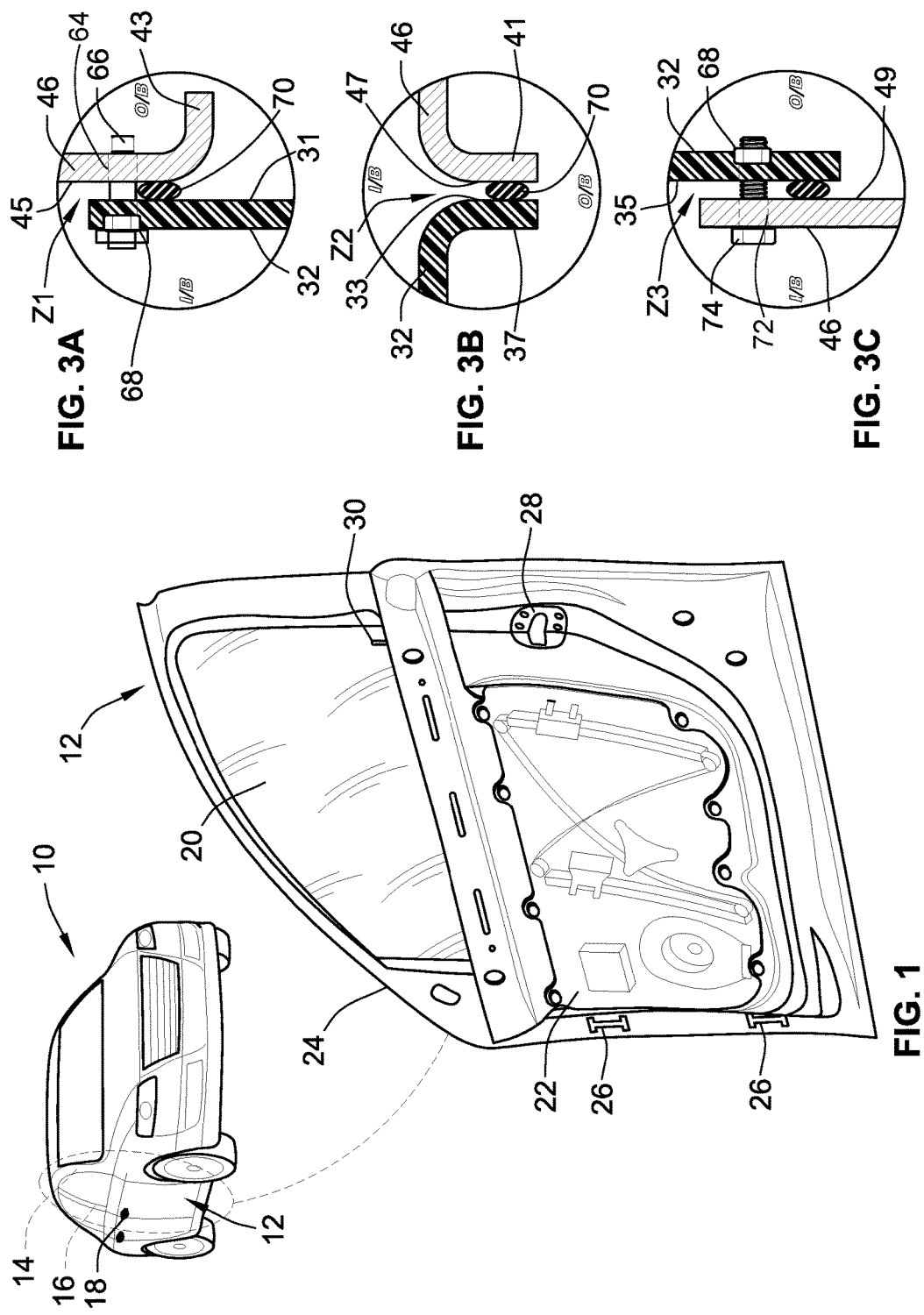

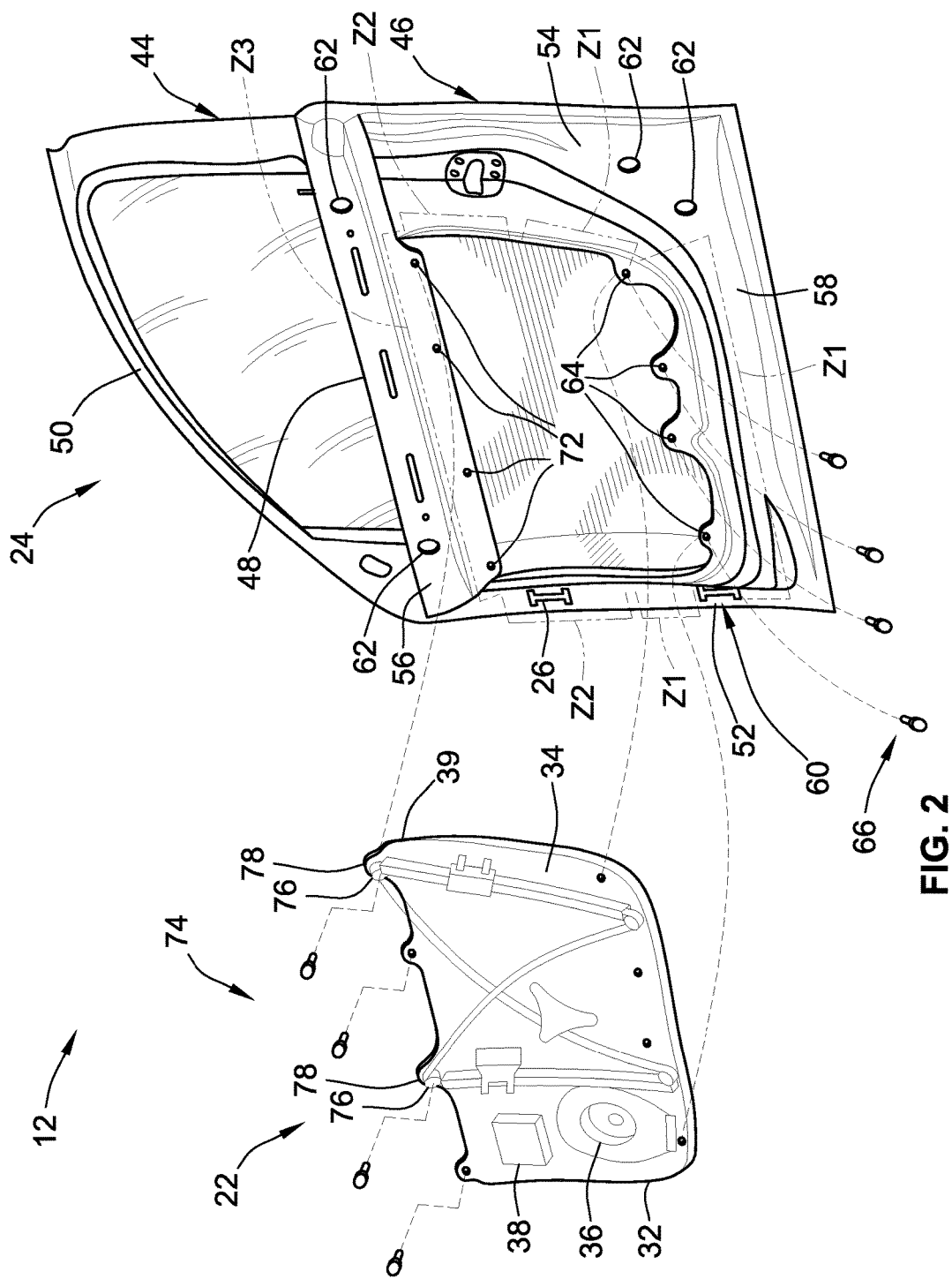

INNER SUPPORT PANEL FOR MOUNTING A HARDWARE MODULE OF A VEHICLE DOOR ASSEMBLY

TECHNICAL FIELD

The present disclosure relates generally to door assemblies for motor vehicles. More specifically, aspects of this disclosure relate to structural interfaces for mounting the mechanical and electrical hardware module of a vehicle door assembly to the door's inner support panel.

BACKGROUND

Current production motor vehicles, such as the modern-day automobile, are originally equipped with driver-side and passenger-side door assemblies that are movably mounted to the vehicle's body-in-white to protect the contents of the passenger compartment and to provide access for entering and exiting the vehicle. Many conventional vehicle door assemblies are designed with an armrest that extends from the interior of the door assembly into the passenger compartment. Typically part of a decorative trim arrangement defining the door assembly's interior surface, the armrest is often integrated with a door latch release lever and a pull-handle or pull-cup used to open and close the door assembly. A door handle is also provided along an outer door panel and employed to open and close the door assembly from outside the vehicle. A conventional exterior door handle includes a pull-bar handle portion that is pivotable on a bracket or chassis that is mounted to the outer door panel. Pivotal movement of the handle portion applies tension to a cable that moves a latch mechanism to release the latch and open the door. A locking mechanism can also be provided to prevent the vehicle door assembly from unwantedly opening during or after operation of the vehicle.

Many vehicle door assemblies are designed as multilayer sandwich structures with an outer "A-surface" door panel mounted on the outboard side of a stamped sheet-metal inner support panel, and with an interior trim panel mounted to the inboard side of the support panel to face into the passenger compartment. The door's various electrical and mechanical hardware components, such as the window lift assembly, acoustic speakers, door latch assembly, door lock assembly, electrical harness, etc., are packaged between these interconnected panels. For instance, the window lift assembly and door latch/lock systems utilize high-tension cable and pulley arrangements that are sandwiched between the outer door panel and interior trim panel. To decrease the time and complexity associated with assembling the entire vehicle door, some or all of the foregoing hardware components can be preassembled onto a unit carrier to form a unitary subassembly, more commonly known as a "door hardware module." In so doing, the unit carrier, together with the already-mounted functional hardware components, can be fitted as a complete, and possibly pretested, hardware module into the door structure.

SUMMARY

Disclosed herein are inner support panels for vehicle door assemblies, methods for making and methods for using such inner support panels, and motor vehicles with vehicle door assemblies including an inner support panel with a door hardware module mounted thereto. By way of non-limiting example, an improved stamped-metal door inner panel with a multi-sided attachment interface for a door hardware module is presented. The door inner panel (referred to interchangeably as "inner support panel") is formed with an upper "header" section, which defines a window frame for receiving a movable window glass pane, integrally adjoined with a lower "shell" section, which defines a hardware frame for receiving the door hardware module. That is, the shell section is fabricated with a forward hinge pillar and rearward latch pillar that cooperate with a window beltline and toe pan section to define a central hardware frame or "cutout" designed to nest therein the hardware module. Formed around the inner periphery of this hardware frame are three (or more) mounting interface zones: Zone 1 is formed along the inboard surface of the door inner panel and includes fastener slots for mounting to an outboard surface of the door hardware module's unit carrier; Zone 2 is formed along a fore-aft surface of the door inner panel and includes a sealing structure for attaching to a peripheral surface of the door hardware module's unit carrier; and Zone 3 is formed along the outboard surface of the door inner panel and includes fastener slots for mounting to an inboard surface of the door hardware module's unit carrier.

Each of the mounting interface zones may be partitioned into zone sections that are spaced around the periphery of the hardware frame. As an example, Zone 1 may include one section positioned adjacent the forward hinge pillar, another section positioned adjacent the rearward latch pillar, and a third section positioned adjacent the toe pan of the door inner panel. Likewise, Zone 2 may include one section positioned adjacent the forward hinge pillar, and another section positioned adjacent the rearward latch pillar. For at least some embodiments, Zone 2 generally functions as an intermediate section for transitioning between Zones 1 and 3, and may include a flange projecting generally orthogonally from the inner periphery of the hardware frame. With this arrangement, the execution of, e.g., a foamed-in-place seal between the module unit carrier and door inner panel seals the module to both I/B and O/B sides of the inner panel. Also disclosed are methods of securing an automotive side-door hardware module to a door inner panel. This new method shifts the seal surface, e.g., approximately 100 mm, from the upper corners on the outboard side of the module unit carrier to a fore-aft surface on a flange of the door inner panel's central cutout, then transitions the seal on the upper edge of the module to the inboard side of the module on an outboard surface of the door inner panel.

Attendant benefits for at least some of the disclosed concepts include being able to attach an upper sheet metal flange of the door inner panel on the inboard side of the door hardware module. By this means, a dedicated bolt or other fastener can be driven through the flange and into the pulley structure of the window lift assembly to provide additional structural robustness to the pulley. Also, by shifting the pulley and the upper seal surface of the door hardware module to the outboard side of the door inner panel, the pulley can be positioned higher in the door cavity. This change in positioning helps to increase the amount of window glass that can be dropped within the interior packaging space of the door assembly and thereby helps to increase studio design freedom on belt line height. Put another way, repositioning the pulley can help to increase the length of glass drop that can be packaged with the door hardware module.

Aspects of the present disclosure are directed to rigid inner support panels for multi-layered door assemblies of motor vehicles. Disclosed, for example, is a door inner panel for a door assembly of a motor vehicle with a vehicle body having a door frame. The door assembly includes a hardware module with, among other things, a windowpane and a window lift assembly operatively mounted to a unit carrier. The door inner panel includes a header section with a window sill that is connected to a window arch to cooperatively define a (full or partial) window frame for receiving the windowpane. A shell section, which is integrally formed with or otherwise attached to the header section, is configured to mount to the door frame of the vehicle body. The shell section includes a hinge pillar that is connected to a latch pillar by a window beltline to cooperatively define a hardware frame for receiving therein the hardware module. This hardware frame includes: a first mounting interface (or zone) that is formed along an inboard surface of the shell section and includes coupling structure configured to attach to an outboard surface of the hardware module's unit carrier; a second mounting interface that is formed along a fore-aft surface of the shell section and includes coupling structure configured to attach to a peripheral surface of the hardware module's unit carrier; and a third mounting interface that is formed along an outboard surface of the shell section and includes coupling structure configured to attach to an inboard surface of the hardware module's unit carrier.

Other aspects of the present disclosure are directed to motor vehicles with multi-layered vehicle door assemblies with internally mounted electrical and mechanical hardware modules. A "motor vehicle," as used herein, may include any relevant vehicle platform, such as passenger vehicles (internal combustion engine (ICE), hybrid, electric, fuel cell, etc.), commercial vehicles, industrial vehicles, military vehicles, all-terrain vehicles (ATV), farm equipment, boats, airplanes, spacecraft, etc. In one example, a motor vehicle includes a vehicle body with a door frame having opposing fore and aft frame pillars, and a door assembly seated within the door frame and movably mounted to the vehicle body. The door assembly includes a door hardware module with a door lock assembly, a speaker, a windowpane, and an electronic window lift assembly all mounted to a module unit carrier. The door assembly also includes a door inner panel that is interposed between an outer door panel and an interior trim panel.

The door inner panel includes an upper header section integrally formed with or otherwise attached to a lower shell section. This header section includes a window sill connected to a window arch to cooperatively define a (full or partial) window frame for nesting therein the windowpane. The shell section, on the other hand, includes a hinge pillar that is pivotably hinged to the fore frame pillar, a latch pillar that is releasably latched to the aft frame pillar of the door frame, and a window beltline that extends between and connects the hinge and latch pillars to cooperatively define a hardware frame that nests therein the hardware module. For mounting the door hardware module to the door inner panel, the hardware frame includes: a first mounting interface extending along an inboard surface of the shell section and including a first coupling structure attached via fasteners to an outboard surface of the module unit carrier; a second mounting interface extending along a fore-aft surface of the shell section and including a second coupling structure sealingly attached via an adhesive seal structure to a peripheral surface of the module unit carrier; and a third mounting interface extending along an outboard surface of the shell section and including a third coupling structure attached via fasteners to an inboard surface of the unit carrier.

In yet other aspects of the present disclosure, methods for making and methods for using stamped-metal inner support frames for vehicle door assemblies are presented. For instance, a method of constructing a door inner panel for a door assembly of a motor vehicle is disclosed. The method includes: forming a header section with a window sill connected to a window arch to cooperatively define a window frame configured to receive a windowpane; forming a shell section configured to mount to a door frame of the vehicle body, the shell section including a hinge pillar connected to a latch pillar by a window beltline to cooperatively define a hardware frame configured to receive the hardware module; and attaching (e.g., via thermoforming, hydroforming, casting, stamping, etc.) the header section to the shell section. The hardware frame is formed with: a first mounting interface extending along an inboard surface of the shell section and including a first coupling structure configured to attach to an outboard surface of the unit carrier of the hardware module; a second mounting interface extending along a fore-aft surface of the shell section and including a second coupling structure configured to attach to a peripheral surface of the unit carrier of the hardware module; and a third mounting interface extending along an outboard surface of the shell section and including a third coupling structure configured to attach to an inboard surface of the unit carrier of the hardware module.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of representative embodiments and modes for carrying out the present disclosure when taken in connection with the accompanying drawings and the appended claims.

BRIEF DESCRIPTION OF THE DRAWINGS

FIG. 1 is an elevated perspective-view illustration of a representative motor vehicle with an inset view of a vehicle door assembly showing a door hardware module mounted to an inner support panel in accordance with aspects of the present disclosure.

FIG. 2 is a partially exploded perspective-view illustration of the vehicle door assembly of FIG. 1 showing inboard, fore-aft and outboard mounting interface regions in accordance with aspects of the present disclosure.

FIG. 3A is a schematic illustration of a portion of the inboard mounting interface region of FIG. 1.

FIG. 3B is a schematic illustration of a portion of the fore-aft mounting interface region of FIG. 1.

FIG. 3C is a schematic illustration of a portion of the outboard mounting interface region of FIG. 1.

The present disclosure is susceptible to various modifications and alternative forms, and some representative embodiments have been shown by way of example in the drawings and will be described in detail herein. It should be understood, however, that the novel aspects of this disclosure are not limited to the particular forms disclosed. Rather, the disclosure is to cover all modifications, equivalents, combinations, subcombinations, and alternatives falling within the spirit and scope of the disclosure as defined by the appended claims.

DETAILED DESCRIPTION OF THE ILLUSTRATED EMBODIMENTS

This disclosure is susceptible of embodiment in many different forms. There are shown in the drawings and will herein be described in detail representative embodiments of the disclosure with the understanding that the present disclosure is to be considered as an exemplification of the principles of the disclosure and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" mean "including without limitation." Moreover, words of approximation, such as "about," "almost," "substantially," "approximately," and the like, can be used herein in the sense of "at, near, or nearly at," or "within 3-5% of," or "within acceptable manufacturing tolerances," or any logical combination thereof, for example.

Referring now to the drawings, wherein like reference numbers refer to like features throughout the several views, there is shown in FIG. 1 a perspective-view illustration of a representative automobile, designated generally at 10, with an arrangement of vehicle doors, which are collectively represented herein for purposes of more detailed discussion by a front passenger-side vehicle door assembly 12. Mounted along a lateral portion of the automobile 10, e.g., to a door frame defined, in part, by fore and aft door frame pillars 14 and 16, respectively, of the vehicle body, the vehicle door assembly 12 is provided with an exterior door handle 18, a movable glass windowpane 20, and a door hardware module 22 that is mounted to a door inner panel 24. The automobile 10—also referred to herein as "motor vehicle" or "vehicle" for short—is merely an exemplary application with which the novel aspects of this disclosure can be practiced. In the same vein, the implementation of the present concepts into a front passenger-side vehicle door assembly should also be appreciated as an exemplary application of the novel concepts disclosed herein. As such, it should be understood that the aspects and features of the present disclosure can be integrated into other door assemblies and utilized for any logically relevant type of motor vehicle. Lastly, the drawings presented herein are not necessarily to scale and are provided purely for instructional purposes. Thus, the specific and relative dimensions shown in the drawings are not to be construed as limiting.

Vehicle door assembly 12 of FIG. 1 can be pivotally mounted, e.g., via multi-stage check-spring door hinges 26, to the vehicle body's door frame to securely close and, when desired, open the door assembly 12 to provide access to the vehicle passenger compartment. The door assembly 12 has a door latch system (represented in the drawings by rotating claw latch 28) for securing the door assembly 12 to the door frame in a closed position. By way of example, and not limitation, the exterior door handle 18 is pulled, pivoted or otherwise moved, e.g., away from the door inner panel 24, to apply a tensile force to an internal cable of the door latch system and thereby activate a spring-biased claw of the claw latch 28. This allows the door assembly 12 to be moved to an open position. Upon release of the door handle 18, the internal cable, which may be of the Bowden cable type, will be biased back to its original position by the spring-biased claw of the claw latch 28 such that the latch mechanism can reengage a complementary latch plate on the door frame's aft pillar 16 when the vehicle door assembly 12 is moved back to the closed position. An optional locking mechanism—represented herein by lock knob 30 and door lock assembly 38 (FIG. 2)—may be provided to prevent unwanted activation of the door latch system.

With reference to both FIG. 1 and FIG. 2, the door hardware module 22 is designed as a unitary assembly with many of the mechanical and electrical subsystems of the door assembly 12 pre-mounted to a single unit carrier 32, which may be of a one-piece blow molded plastic construction. For at least some embodiments, this construction allows for the manufacture, mounting, and testing of the various individual door subsystems at a supplier factory or other offsite location, and the subsequent transport of the preassembled door hardware module 22 for rapid installation into the interior of the vehicle door assembly 12 at an OEM facility. In the illustrated example, an electrical or mechanical window lift assembly 34, an acoustic speaker 36, a door lock assembly 38, a windowpane 20, and a wiring harness (not visible) are each mounted to a dedicated, integrally molded structural element of the door hardware module's 22 unit carrier 32. It is envisioned that the door hardware module 22 may include greater, fewer, and/or alternative hardware components from that which are shown in the drawings, such as electrical switches, lights, acoustical barriers, pyrotechnic air bag modules, door handle cables, etc.

There is shown throughout the drawings a door inner panel 24 (referred to interchangeably as "inner support panel") that generally functions as the structurally supportive member of the vehicle door assembly 12, e.g., transferring loads to the fore and aft door frame pillars 14, 16 (also known in the art as "A-pillar" and "B-pillar"). Vehicle door assembly 12 is of a multilayer construction with the door inner panel 24 sandwiched between, and providing physical support for, an outer door panel (FIG. 1) and an interior trim panel (FIG. 2). While certainly amendable to multi-piece constructions, the illustrated door inner panel 24 is integrally formed as a single-piece unitary structure, e.g., via stamping, casting, thermoforming, hydroforming, etc. Those skilled in the art will recognize a variety of materials that may be employed to form the door inner panel 24, including various metals and plastics. It may be preferable, depending on application, to cut and stamp the inner panel 24 from a more robust, weightier metal, such as steel and alloys thereof, or a lightweight metal, such as aluminum or magnesium. Superplastic forming, quick plastic forming, or sheet hydroforming can be employed to form the contours of a polymeric inner support panel 24 so that a more complex shape can be realized than is generally achievable with stamping. Holes, apertures, and slots can be cut, punched, or drilled after the basic shape and contours are formed. The thickness of the inner support panel 24 may be about 0.5 millimeters (mm) to about 4 mm, according to an embodiment.

Turning to FIG. 2, the door inner panel 24 is fabricated with two primary sections: an upper "header" section 44 that is integrally formed with or otherwise physically attached to a lower "shell" section 46. Header section 44 is generally composed of a horizontal window sill segment 48 that is adjoined with a curved window arch segment 50 to cooperatively define a window frame for receiving, stabilizing and reinforcing the closed windowpane 20 against vibrations and external loading generated during normal operation of the vehicle. While the vehicle door assembly 12 may comprise a sashless window frame configuration, the opposing ends of window arch 50 presented in FIGS. 1 and 2 are interconnected with respective opposing ends of the window sill 48 such that the window frame extends in a continuous manner. The inner periphery of the window frame can be covered by a seal structure (most commonly known as a "weatherstrip") to prevent, for example, the unwanted ingress of rain, wind, dust, and other environmental conditions from the exterior of the vehicle 10 when the windowpane 20 is in a closed position.

Subjacent to the header section 44 of the door inner panel 24 is a shell section 46 onto which is mounted the door hardware module 22 and, optionally, an outer door panel and interior trim panel, as will be described in further detail below. Situated at a forward edge of the shell section 46 is a generally vertical hinge pillar 52 that is pivotably hinged, e.g., via door hinges 26 of FIG. 1, to the forward frame pillar 14 of the vehicle's 10 body-in-white (BIW) frame. On the opposing edge of the shell section 46, opposite that of the hinge pillar 52, is a generally vertical latch pillar 54 that is releasably latched, e.g., via claw latch 28, to the rearward frame pillar 16. In addition to the two pillars 52, 54, the shell section 46 is further composed of a horizontal window beltline segment 56 that is vertically spaced from and generally parallel to a horizontal toe pan segment 58. The window beltline 56 and toe pan 58 extend between and connect the hinge and latch pillars 52, 54 to cooperatively define a central hardware frame (also referred to as "cutout"; designated generally at 60) for nesting therein the hardware module 22. Disposed in a clockwise manner around the hardware frame 60 along the inboard surface of the shell section 46 is a trim mounting interface with an array of clip slots 62 that mate with, for example, push-type trim retainer clips (not shown) for mounting thereto the interior trim panel. The outer door panel, which is more colloquially known as a "door skin," is coupled, e.g., via crimping, welding, bonding, fasteners, etc., to a complementary panel mounting interface along the outboard surface of the shell section 46.

Central hardware frame 60 is fabricated with a multisided attachment interface for mounting the door hardware module 22 to the door inner panel 24. Formed around the inner periphery of the hardware frame 60 of FIG. 2, for example, are at least three mounting interface zones: a first mounting interface zone Z1, which is represented by the cross-sectional view presented in FIG. 3A; a second mounting interface zone Z2, which is represented by the cross-sectional view presented in FIG. 3B; and a third mounting interface zone Z3, which is represented by the cross-sectional view presented in FIG. 3C. The first mounting interface zone Z1, which is formed along an inboard (I/B) surface 45 of the lower shell section 46 proximate the inner periphery of the hardware frame 60, includes "first" coupling structure for attaching to an outboard (O/B) surface 31 of the hardware module's 22 unit carrier 32. By contrast, the second mounting interface zone Z2, which is formed along a forward-facing or rearward-facing (fore-aft) surface 47 of the shell section 46 projecting from the inner periphery of the hardware frame 60, includes "second" coupling structure for attaching to a peripheral surface 33 on the lateral perimeter of the unit carrier 32. Third mounting interface zone Z3, on the other hand, is formed along an outboard (O/B) surface 49 of the lower shell section 46 proximate the inner periphery of the hardware frame 60, and includes "third" coupling structure for attaching to an inboard surface 35 of the unit carrier 32.

To mechanically mount the hardware module's 22 unit carrier 32 to the inboard surface 45 of the inner panel's 24 lower shell section 46, the first coupling structure of the first mounting interface zone Z1 is provided with a first series of laterally spaced fastener slots, each designated 64 in FIG. 2, that extends generally parallel with respect to the toe pan segment 58. These fastener slots 64 (also referred to herein as "fastener apertures") receive and mechanically mate with a corresponding number of module fasteners, such as quarter-turn fasteners 66. These fasteners 66 are passed through pre-affixed on assembly (POA) nuts 68 of unit carrier 32, via the carrier's inboard surface 35, and into the shell section 46 via the inboard surface 45. A "foamed-in-place" seal 70 (or other seal structure) is interposed between and sealingly connects the inboard and outboard surfaces 45, 31 of the door panel 24 and hardware module 22. The first mounting interface zone Z1 is also provided with a minor flange 43, e.g., of approximately 5 mm, that projects generally orthogonally from the inner periphery of the hardware frame 60. According to the illustrated example, the first mounting interface zone Z1 can be segmented into three mounting zone sections: a first mounting zone section that is generally vertical and positioned adjacent the shell section's 46 hinge pillar 52, a second mounting zone section that is generally vertical and positioned adjacent the latch pillar 54, and a third mounting zone section that is generally horizontal and positioned adjacent the toe pan segment 58 of the shell section 46.

To sealingly attach the lateral sides of the hardware module's 22 unit carrier 32 to the inner periphery of the hardware frame 60, the second coupling structure of the second mounting interface zone Z2 is provided with an enlarged flange 41, e.g., of approximately 10 mm, that projects generally orthogonally from the inner periphery of the hardware frame 60. The forward-facing or rearward-facing surface of this enlarged flange 41—depending upon from which side of the hardware frame 60 the flange 41 is projecting (FIG. 2)—sealingly attaches, e.g, via foamed-in-place seal 70, to a peripheral surface 33 on a complementary flange 37 projecting from one of the lateral sides of the unit carrier 32. In the illustrated example, the second mounting interface zone Z2 is segmented into at least two mounting zone sections: a first mounting zone section that is generally vertical and positioned adjacent the shell section's 46 hinge pillar 52, interposed between sections of the first and third mounting interfaces Z1 and Z3; and a second mounting zone section that is generally vertical and positioned adjacent the latch pillar 52, interposed between sections of the first and third mounting interfaces Z1 and Z3.

To mechanically mount the hardware module's 22 unit carrier 32 to the outboard surface 49 of the inner panel's 24 lower shell section 46, the third coupling structure of the third mounting interface zone Z3 is provided with a second series of laterally spaced fastener slots, each designated 72 in FIG. 2, that extends generally parallel with respect to the window beltline 56. These fastener slots 72 (also referred to herein as "fastener apertures") receive and threadably mate with a corresponding number of module fasteners, such as bolts 74. These bolts 74 are passed through the inner panel 24, via the shell section's 46 outboard surface 49, and into the unit carrier 22. According to the illustrated example, the third mounting interface zone Z3 is formed along the window beltline 56 extending generally parallel to the window sill 48. To accommodate this mounting interface, at least the upper portion of the door hardware module's 22 unit carrier 32 is configured to seat on the outboard side of the door inner panel 24 while at least the lower portion of the unit carrier 32 is configured to seat on the inboard side of the inner panel 24. As shown, the upper portion of the unit carrier 32 has a reduced thickness upper section 39 that passes through the hardware frame 60 and abuts the surface 49 of the lower shell section 46. With this mounting interface architecture, cable pulleys 76 of the window lift assembly 34 can be rotatably mounted (e.g., via threaded rivets) to respective bolt lips 78 such that the bolts 74 provide additional structural support for operation of the window lift assembly 34.

While aspects of the present disclosure have been described in detail with reference to the illustrated embodiments, those skilled in the art will recognize that many changes may be made thereto without departing from the scope of the present disclosure. The present disclosure is not limited to the precise construction and compositions disclosed herein; any and all modifications, changes, and variations apparent from the foregoing descriptions are within the spirit and scope of the disclosure as defined in the appended claims. Moreover, the present concepts expressly include any and all combinations and subcombinations of the preceding elements and aspects.

What is claimed:

1. A door inner panel for a door assembly of a motor vehicle, the motor vehicle including a vehicle body with a door frame, and the door assembly including a hardware module comprising a unit carrier having a windowpane and a window lift assembly mounted thereto, the door inner panel comprising:
    a window frame configured to receive the windowpane; and
    a shell section configured to mount to the door frame of the vehicle body, the shell section including a hinge pillar connected to a latch pillar by a beltline segment and a toe pan segment to cooperatively define a hardware frame configured to receive therein and surround the hardware module, the hardware frame including:
        a first mounting interface located along an inboard surface of the shell section which is attached to an outboard surface of the unit carrier of the hardware module;
        a second mounting interface adjoining the first mounting interface and comprising a flanged surface of the shell section which is attached to a peripheral surface of the unit carrier of the hardware module; and
        a third mounting interface adjoining the second mounting interface and located along an outboard surface of the shell section which is attached to an inboard surface of the unit carrier of the hardware module,
    wherein the window frame and the shell section are integrally formed as a single-piece unitary structure.

2. The door inner panel of claim 1, wherein a set of the first mounting interface includes a set of fastener apertures configured to receive a plurality of module fasteners passed through the unit carrier and into the shell section.

3. The door inner panel of claim 2, wherein the first mounting interface includes a flange projecting generally orthogonally from an inner periphery of the hardware frame.

4. The door inner panel of claim 1, wherein the flanged surface projects generally orthogonally from an inner periphery of the hardware frame and is configured to sealingly attach to the peripheral surface of the unit carrier via a seal structure.

5. The door inner panel of claim 4, wherein the second mounting interface is interposed between the first and third mounting interfaces.

6. The door inner panel of claim 1, wherein the third mounting interface includes fastener apertures configured to receive a plurality of module fasteners passed through the shell section and into the unit carrier.

7. The door inner panel of claim 6, wherein the third mounting interface comprises a portion of the beltline segment.

8. The door inner panel of claim 1, wherein the first mounting interface is segmented into a first mounting zone section positioned adjacent the hinge pillar, a second mounting zone section positioned adjacent the latch pillar, and a third mounting zone section positioned adjacent the toe pan segment of the shell section.

9. The door inner panel of claim 1, wherein the second mounting interface further includes a second flanged surface of the shell section.

10. The door inner panel of claim 1, wherein the window frame includes a window arch adjoined to opposing ends of the beltline segment.

11. The door inner panel of claim 1, wherein the shell section includes a trim mounting interface configured to have mounted thereto an interior trim panel, and the shell section includes a panel mounting interface configured to have mounted thereto a outer door panel.

12. The door inner panel of claim 1, wherein the hinge pillar is configured to pivotably attach to the door frame of the vehicle body.

13. The door inner panel of claim 1, wherein the window frame and the shell section are integrally formed via stamping or hydroforming.

14. A motor vehicle, comprising:
    a vehicle body having a door frame; and
    a door assembly including:
        a door hardware module comprising a unit carrier having a door lock assembly, a speaker, a windowpane, and a window lift assembly mounted thereto;
        an outer door panel;
        an interior trim panel; and
        a door inner panel sandwiched between the outer door panel and the interior trim panel, the door inner panel including a header section and a shell section, the header section including a window frame for receiving the windowpane, the shell section including a hinge pillar pivotably hinged to the door frame, a latch pillar releasably latched to the door frame, a beltline segment, and a toe pan segment, the beltline and toe pan segments both extending between and connected to the hinge and latch pillars to cooperatively define a hardware frame receiving and surrounding the hardware module, the hardware frame including:
            a first mounting interface located along an inboard surface of the shell section which is attached via fasteners to an outboard surface of the unit carrier of the hardware module;
            a second mounting interface adjoining the first mounting interface and comprising a flanged surface of the shell section which is attached via a seal structure to a peripheral surface of the unit carrier; and
            a third mounting interface adjoining the second mounting interface and located along an outboard surface of the shell section which is attached via fasteners to an inboard surface of the unit carrier,
        wherein the header section and the shell section are integrally formed as a single-piece unitary structure.

15. A method of constructing a door inner panel for a door assembly of a motor vehicle, the motor vehicle including a vehicle body with a door frame, and the door assembly including a hardware module comprising a unit carrier having a windowpane and a window lift assembly mounted thereto, the method comprising:

forming a window frame configured to receive the windowpane;

forming a shell section configured to mount to the door frame of the vehicle body, the shell section including a hinge pillar connected to a latch pillar by a beltline segment and a toe pan segment to cooperatively define a hardware frame configured to receive the hardware module, wherein the hardware frame is formed with:

a first mounting interface extending along an inboard surface of the shell section which is attached to an outboard surface of the unit carrier of the hardware module;

a second mounting interface adjoining the first mounting interface and comprising a flanged surface of the shell section which is attached to a peripheral surface of the unit carrier of the hardware module; and a third mounting interface adjoining the second mounting interface and extending along an outboard surface of the shell section which is attached to an inboard surface of the unit carrier of the hardware module, wherein the window frame and the shell section are integrally formed as a single-piece unitary structure.

16. The method of claim 15, wherein a set of the first mounting interface includes a set of fastener apertures configured to receive a plurality of module fasteners passed through the unit carrier into the shell section.

17. The method of claim 15, wherein the flanged surface projects generally orthogonally from an inner periphery of the hardware frame and is configured to sealingly attach to the peripheral surface of the unit carrier.

18. The method of claim 15, wherein the third mounting interface includes fastener apertures configured to receive a plurality of module fasteners passed through the unit carrier into the shell section.

19. The method of claim 15, wherein the second mounting interface is interposed between the first and third mounting interfaces.

20. The method of claim 15, wherein the window frame and the shell section are integrally formed from a metallic material via stamping or hydroforming.

* * * * *